United States Patent
Mayer

(10) Patent No.: US 11,038,732 B2
(45) Date of Patent: Jun. 15, 2021

(54) PEAK-TO-AVERAGE POWER RATIO REDUCTION FOR IQ TRANSMITTERS

(71) Applicant: Apple Inc., Cupertino, CA (US)

(72) Inventor: Christian Mayer, Wilhering (AT)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/607,893

(22) PCT Filed: Jun. 27, 2017

(86) PCT No.: PCT/US2017/039435
§ 371 (c)(1),
(2) Date: Oct. 24, 2019

(87) PCT Pub. No.: WO2019/005007
PCT Pub. Date: Jan. 3, 2019

(65) Prior Publication Data
US 2020/0119961 A1    Apr. 16, 2020

(51) Int. Cl.
*H04L 27/26* (2006.01)
*H04L 27/34* (2006.01)

(52) U.S. Cl.
CPC ...... *H04L 27/2623* (2013.01); *H04L 27/3411* (2013.01)

(58) Field of Classification Search
CPC .................... H04L 27/3411; H04L 27/2623
See application file for complete search history.

(56) References Cited

U.S. PATENT DOCUMENTS

| | | | |
|---|---|---|---|
| 6,307,898 B1* | 10/2001 | Ido | H04L 27/066 329/307 |
| 7,212,583 B2* | 5/2007 | Lindh | H04L 27/36 375/261 |
| 7,318,185 B2* | 1/2008 | Khandani | H04L 1/004 714/758 |

(Continued)

FOREIGN PATENT DOCUMENTS

| | | | | |
|---|---|---|---|---|
| CN | 110679126 A * | 1/2020 | | H04L 27/2623 |
| EP | 1271769 A2 * | 1/2003 | | H03G 11/00 |

(Continued)

OTHER PUBLICATIONS

International Preliminary Report on Patentability dated Dec. 31, 2019 for International Application No. PCT/US2017/039435.

(Continued)

*Primary Examiner* — Berhanu Tadese
(74) *Attorney, Agent, or Firm* — Eschweiler & Potashnik, LLC

(57) ABSTRACT

A method configured to clip an I signal and a Q signal according to a clipping boundary, includes receiving an I value and a Q value, wherein the I value and Q value define Cartesian coordinates of a data point being transmitted on the real and imaginary axes of the complex plane, respectively; determining a clipping error between the I value and the Q value and the clipping boundary; combining the clipping error with the I value to generate a clipped I value; combining the same clipping error with the Q value to generate a clipped Q value; and providing the clipped I value and the clipped Q value to a radio frequency digital-to-analog converter (RFDAC) in a transmit chain.

18 Claims, 3 Drawing Sheets

(56) References Cited

U.S. PATENT DOCUMENTS

| | | | |
|---|---|---|---|
| 7,409,009 B2* | 8/2008 | Akhtman | H04L 27/2624 375/296 |
| 7,418,043 B2* | 8/2008 | Shattil | H04L 1/04 375/260 |
| 8,098,751 B2* | 1/2012 | Shattil | H04L 27/2601 375/260 |
| 8,548,085 B2* | 10/2013 | McGowan | H04L 27/2624 375/267 |
| 8,548,092 B2* | 10/2013 | Kang | H04L 27/2624 375/296 |
| 8,744,002 B2* | 6/2014 | Maehata | H04L 27/2624 375/297 |
| 8,787,495 B2* | 7/2014 | Maehata | H04J 11/0023 375/297 |
| 8,937,993 B2* | 1/2015 | Yu | H04L 27/2624 375/232 |
| 9,559,815 B1* | 1/2017 | Goshen | H04L 27/3411 |
| 9,917,617 B2* | 3/2018 | Vanderhaegen | H04B 3/32 |
| 10,032,402 B2* | 7/2018 | Kempf | G09G 3/2003 |
| 10,069,522 B2* | 9/2018 | Terry | H04W 48/10 |
| 10,084,616 B2* | 9/2018 | Kim | H04L 25/0262 |
| 10,367,671 B2* | 7/2019 | Fu | H04B 1/0475 |
| 10,574,277 B2* | 2/2020 | Terry | H04J 13/0018 |
| 2004/0101062 A1* | 5/2004 | Lindh | H04L 27/36 375/261 |
| 2004/0141548 A1* | 7/2004 | Shattil | H04L 27/0004 375/146 |
| 2004/0218689 A1* | 11/2004 | Akhtman | H04L 27/2624 375/296 |
| 2008/0118002 A1* | 5/2008 | Fonseka | H04L 27/2025 375/298 |
| 2008/0310484 A1* | 12/2008 | Shattil | H04L 27/2614 375/146 |
| 2009/0285194 A1* | 11/2009 | Kim | H03F 3/19 370/342 |
| 2010/0109734 A1* | 5/2010 | Rylov | H03H 11/20 327/256 |
| 2011/0182339 A1* | 7/2011 | Kang | H04L 27/2624 375/224 |
| 2012/0300824 A1* | 11/2012 | Maehata | H04L 27/2624 375/224 |
| 2012/0320948 A1* | 12/2012 | McGowan | H04L 27/2624 375/133 |
| 2012/0321014 A1* | 12/2012 | Maehata | H04L 27/2624 375/295 |
| 2016/0191117 A1* | 6/2016 | Vanderhaegen | H04B 3/32 370/201 |
| 2017/0111188 A1* | 4/2017 | Deng | H03F 3/245 |
| 2017/0163296 A1* | 6/2017 | Terry | H04B 7/0413 |
| 2017/0180168 A1* | 6/2017 | Terry | H04B 1/69 |
| 2017/0187550 A1* | 6/2017 | Kim | H04L 25/02 |
| 2019/0165981 A1* | 5/2019 | Fu | H04L 27/2628 |
| 2020/0119961 A1* | 4/2020 | Mayer | H04L 27/3411 |

FOREIGN PATENT DOCUMENTS

| | | | | |
|---|---|---|---|---|
| EP | 1271769 A3 * | 3/2004 | | H03G 11/00 |
| EP | 1758330 A1 * | 2/2007 | | H04L 27/08 |
| EP | 1758330 A1 | 2/2007 | | |
| EP | 1758330 A4 * | 7/2010 | | H04L 27/2623 |
| EP | 3646543 A1 * | 5/2020 | | H04L 27/2623 |
| WO | WO-2019005007 A1 * | 1/2019 | | H04L 27/2623 |

OTHER PUBLICATIONS

International Search Report dated Mar. 9, 2018 for International Application No. PCT/US2017/039435.

Deng, Zhiming et al. "A Dual-Band Digital-WiFi 802.11a/b/g/n Transmitter SoC with Digital I/Q Combining and Diamond Profile Mapping for Compact Die Area and Improved Efficiency in 40nm CMDS." ISSCC 2016/Session 9/High-Performance Wireless/9.5. 2016 IEEE International Solid-State Circuits Conference. 4 pages.

* cited by examiner

PEAK-TO-AVERAGE POWER RATIO REDUCTION FOR IQ TRANSMITTERS

This application is a National Phase entry application of International Patent Application No. PCT/US2017/039435 filed Jun. 27, 2017 entitled "PEAK-TO-AVERAGE POWER RATIO REDUCTION FOR IQ TRANSMITTERS" in the name of Christian Mayer and is hereby incorporated by reference in its entirety.

BACKGROUND

The ratio between a transmit signal's peak value and its root mean square (RMS) value is an important measure for a transmitter. This ratio, which is commonly called the peak-to-average power ratio (PAPR), determines the efficiency of the transmitter's output stage, or more generally, any analog amplifier stage in the transmit chain. For example, the RMS output power requirement for the transmitter's power amplifier (PA) may be defined by combining wanted connection range and cost-optimized RF front-end design. The signal PAPR then defines the peak power requirement for maintaining adequate linearity of the PA.

DETAILED DESCRIPTION

Figure 1:
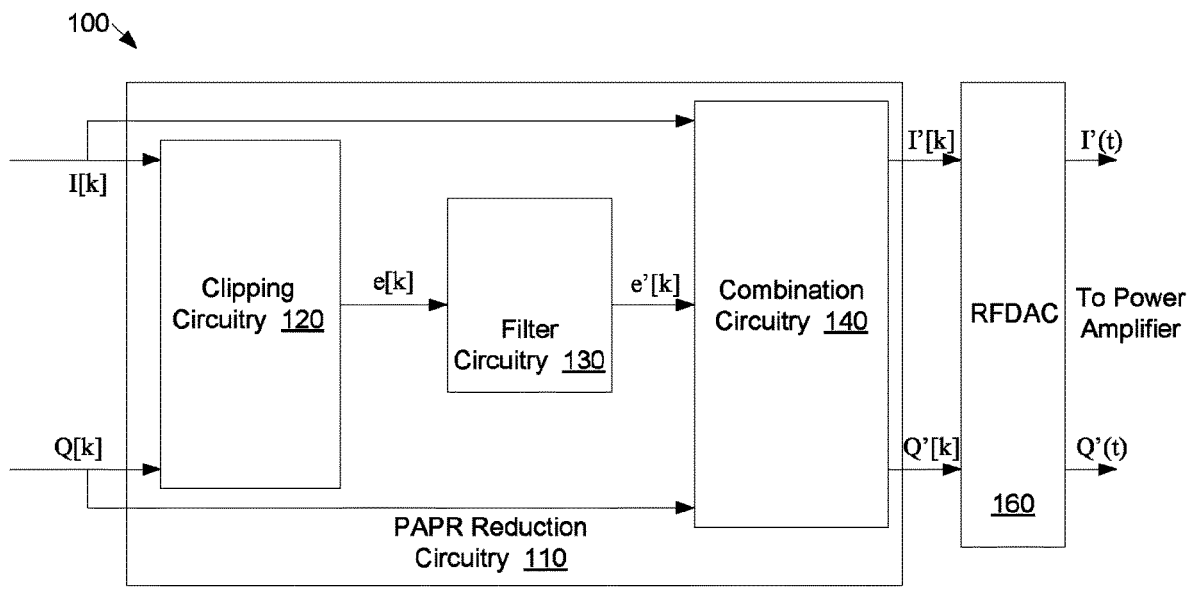
FIG. 1 illustrates an exemplary PAPR reduction circuitry that clips peaks in an I signal and a Q signal in accordance with various aspects described.

In an IQ transmitter, the transmit signal is broken into an I component and a Q component which may be processed in separate processing paths. At any given time, a value of the I signal component (hereinafter the "I value") and a value of the Q signal component (hereinafter the "Q value") define Cartesian coordinates describing a data point being communicated. In the complex plane, conventionally the horizontal axis is called the real axis and is labeled as the "I" axis and the vertical axis is called the imaginary axis and is labeled as the "Q" axis. Thus, the I value defines the data point's location with respect to the I axis and the Q value defines the data point's location with respect to the Q axis. This is in contrast to polar transmitter in which the transmit signal is broken into a magnitude component and an angle or phase component. At any given time, the magnitude component defines a distance the data point is from the origin of the complex plane and the angle or phase component defines an angle from the 0 degree reference position at which the data point is located.

In a digital IQ transmitter, the radio frequency (RF) digital-to-analog convertors (DACs) convert digital baseband I and Q transmit signal components to analog I and Q transmit signal components and at the same time up-convert the signal components to the desired RF frequency. The analog transmit signals are amplified by a power amplifier for transmission by an antenna. IQ RFDACs suffer in general from a 3 decibel (dB) power penalty when converting signals with a circular boundary shape in the complex plane, compared to the minimal necessary solution (e.g., a polar RFDAC). This power penalty is caused by the fact that the maximum of the sum of I and Q is in its worst case $\sqrt{2}$ times the maximum of the signal magnitude, which is the radius of a circular boundary shape.

Some IQ RFDACs are implemented with max (|I|+|Q|) number of thermometer-coded DAC cells. This architecture has its maximum efficiency at full scale and thus any reduction in the magnitude of the transmit signal causes an efficiency penalty. Therefore, decreasing PAPR of the transmit signal increases the efficiency of the RFDAC at maximum output power. Some PAPR reduction schemes limit the envelope of the instantaneous magnitude and thus require computation of the instantaneous magnitude of the transmit signal, which consumes power. Some PAPR reduction schemes may clip portions of the signal that do not exceed the RFDAC limitation boundary.

Described herein are systems, circuitries, and methods that reduce PAPR by determining a single clipping error that is subtracted from both the I and the Q value to clip I and Q values that exceed the clipping boundary. This use of a single clipping error to adjust both the I and the Q value recognizes symmetry in the clipping error. Because there is a single clipping error rather than separate I and Q clipping errors, the systems, circuitries, and methods described herein can use a single filter to filter the clipping error, reducing components and power consumption.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry" and the like are intended to refer to a computer-related entity, hardware, software (e.g., in execution), and/or firmware. For example, a circuitry can be a circuit, a processor, a process running on a processor, a controller, an object, an executable, a program, a storage device, and/or a computer with a processing device.

FIG. 1 illustrates one example of a baseband architecture 100 of a transmitter that includes exemplary peak-to-average power ratio (PAPR) circuitry 110 and an RFDAC 160. While a single RFDAC is illustrated in FIG. 1, in some examples, the architecture 100 includes multiple RFDACs. The PAPR reduction circuitry 110 receives I and Q values (I[k] and Q[k]) from baseband processing circuitry (not shown) and outputs a digital transmit signal corresponding to clipped I and Q values (I'[k] and Q'[k]) that decrease the PAPR of the signal processed by the RFDAC 160. The RFDAC 160 converts the digital transmit signal (i.e., I'[k] and Q'[k]) to an analog signal that is amplified by a power amplifier (not shown) of the transmitter.

The PAPR reduction circuitry 110 includes clipping circuitry 120, filter circuitry 130, and combination circuitry 140. The clipping circuitry 120 is configured to determine a single clipping error e[k] that will be combined with both the I value I[k] and the Q value Q[k] to generate the clipped I and Q values I'[k] and Q'[k]. The filter circuitry 130 filters the clipping error e[k] to generate a filtered clipping error e'[k]. Because there is a single clipping error, only a single filter circuitry 130 is needed. This is to be contrasted with clipping systems that generate a separate clipping error for the I and Q values, which may require two filters, one for each clipping error. The combination circuitry 140 combines the filtered clipping error e'[k] with the I value I[k] and the Q value Q[k] to generated a clipped I value I'[k] and a clipped Q value Q'[k].

Figure 2:
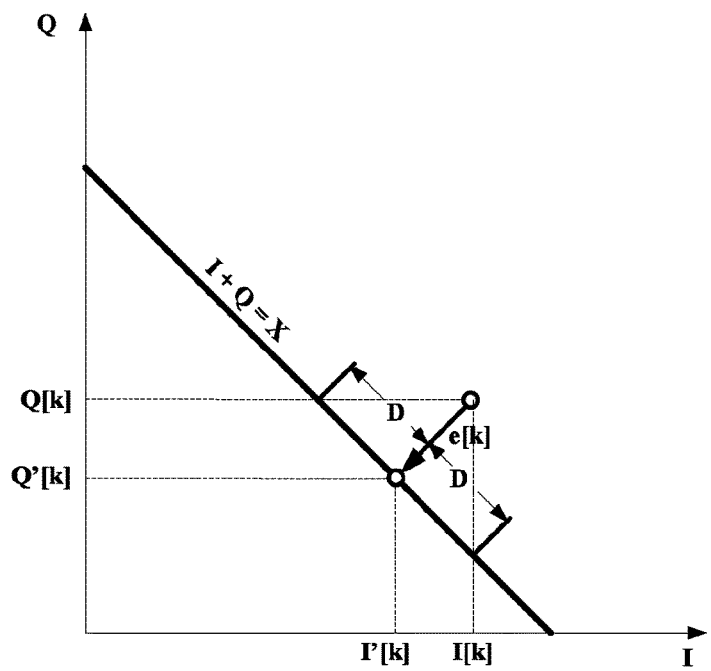
FIG. 2 is a diagram illustrating the vector difference clipping error generated by the PAPR reduction circuitry of FIG. 1 to clip peaks in the I signal and the Q signal.

FIG. 2 illustrates one example of how a single clipping error may be determined for both an I value and a Q value. The clipping circuitry 120 clips the trajectory of the baseband signal I[k], Q[k] to a diamond shape representing the RFDAC limitation |I|+|Q|<=N. The clipping is implemented by projecting a complex trajectory point I[k],Q[k] lying out of the boundary defined by a clipping boundary |I|+|Q|=X onto a nearest point I'[k], Q'[k] on the clipping boundary. FIG. 2 shows the projection for a point in the first quadrant (I>=0, Q=>0). The clipping boundary has a 45° angle in the complex plane and the projection is done 90° to the clipping boundary. Thus, in this example the clipping error e[k] corresponds to the the magnitude of the vector difference between the original vector I[k],Q[k], and the projected vector I'[k], Q'[k]. The symmetry of the clipping error with respect to the I and Q values is shown by the fact that the distances D in FIG. 2 are equal. This means that the same clipping error may be used for both the I signal and the Q signal. Further, when an I and Q value pair falls below or within the clipping boundary, the clipped values I'[k], Q'[k] are equal to the original values (e.g., e[k]=0 for that point).

Figure 3:
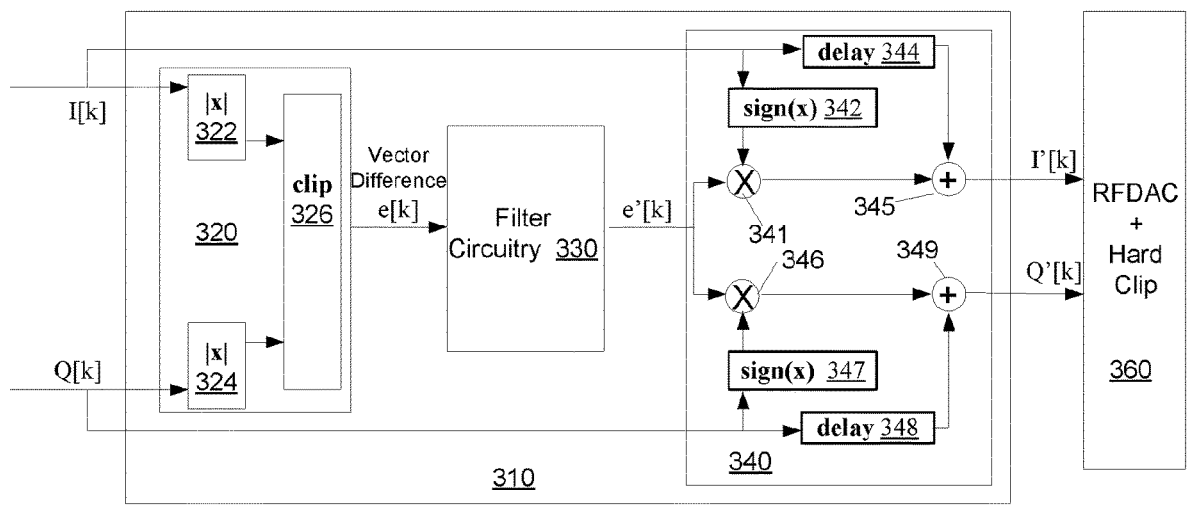
FIG. 3 illustrates an exemplary PAPR reduction circuitry that clips peaks in an I signal and a Q signal in accordance with various aspects described.

FIG. 3 illustrates one example of a baseband architecture 300 of a transmitter that includes exemplary peak-to-average power ratio (PAPR) circuitry 310 and an RFDAC 360 that performs a hard clip operation on the digital transmit signal I'[k], Q'[k]. The PAPR reduction circuitry 310 includes clipping circuitry 320, filter circuitry 330, and combination circuitry 340. The clipping circuitry 320 determines a clipping error e[k] that corresponds to the magnitude of the vector difference between I[k], Q[k] and I'[k], Q'[k] as illustrated in FIG. 2. The clipping circuitry 320 includes circuitry or components that implement an absolute value or magnitude operation on the I value (322) and the Q value (324). This magnitude operation maps the I and Q values to the first quadrant as illustrated in FIG. 2. Error circuitry 326 determines the clipping error e[k] clipping error to be either i) zero if the point defined by |I|, |Q| is below the clipping boundary (e.g., the line |I|+|Q|=X, where X is the clipping limit) or ii) the magnitude of the vector difference between I[k], Q[k] and I'[k], Q'[k] as illustrated in FIG. 2. The clipping error e[k] is filtered by the filter circuitry 330 to generate e'[k].

The combination circuitry 340 includes sign operator circuitries 341, 346 that apply original sign of I[k] and Q[k] to the filtered clipping error e'[k]. This compensates for the magnitude operation performed by the clipping circuitry 320. In one example, the sign operator circuitries perform a 2's complement operation on the filtered clipping error e'[k] to change the sign of the filtered error when the I or Q value is negative. Combination circuitry 345 subtracts the filtered error signal having the same sign as I[k] from an output of a delay operator 344 that delays I[k]. Combination circuitry 349 subtracts the filtered error signal having the same sign as Q[k] from an output of a delay operator 348 that delays Q[k]. The output of combination circuitry 345 is the clipped I signal I'[k]. The output of combination circuitry 349 is the clipped Q signal Q'[k]. The clipped I and Q signals together form the digital transmit signal processed by the RFDAC 360.

The PAPR reduction circuitry 310 provides the correct clipped signal as long as two subsequent peaks that are clipped and filtered are separated in time by a longer duration than the filtering circuitry 340 has settling time. While this cannot be guaranteed for all signals, simulations have shown that the error made by overlapping transients of clipping errors with a partially wrong sign are small enough to be negligible and occurs at very low power spectral density (PSD).

The filtering circuitry reduces the height of the clipping error and may therefore cause peak regrowth in the final clipped signal. Therefore, in the example of FIG. 3 the RFDAC 360 includes a hard clipping function that imposes a hard limitation on the values of I'[k] and Q'[k]. This hard clipping operation limits the digital transmit signal to a final boundary. The hard clipping operation can be implemented directly at the RFDAC input code.

Figure 4:
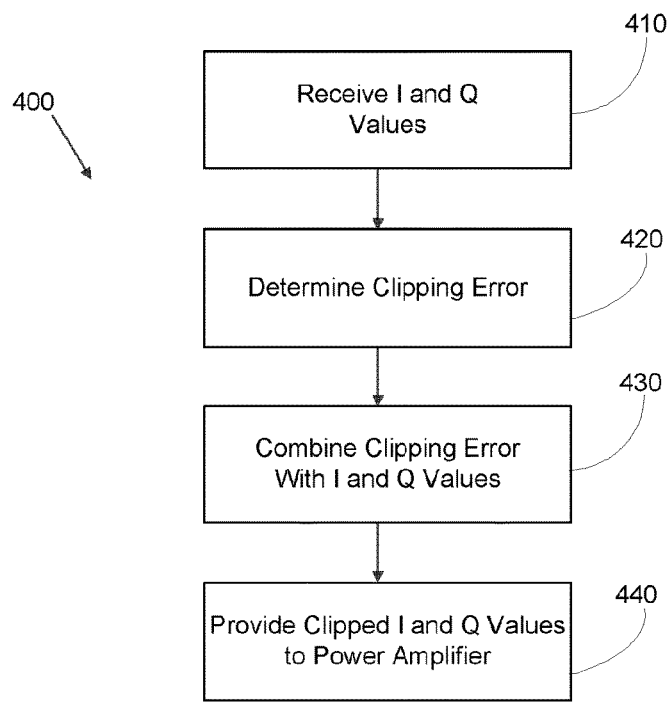
FIG. 4 illustrates a flow diagram of an exemplary method for clipping peaks in an I signal and a Q signal in accordance with various aspects described.

FIG. 4 illustrates a flow diagram outlining one embodiment of a method 400 configured to clip I and Q values according to a clipping boundary. The method 400 may be performed by PAPR reduction circuitry 110, 310, of FIGS. 1 and 3, respectively. The method includes, at 410, receiving an I value and a Q value. At 420 a clipping error between the I value and the Q value and the clipping boundary is determined. The clipping error is combined with the I value to generate a clipped I value and the Q value to generate a clipped Q value at 430. At 440 the method includes providing the clipped I value and the clipped Q value to a power amplifier in a transmit chain.

It can be seen from the foregoing description that calculating a single clipping error and applying the clipping error to both an I signal and a Q signal reduces the number of components necessary to implement a clipping system while still providing satisfactory results.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Figure 5:
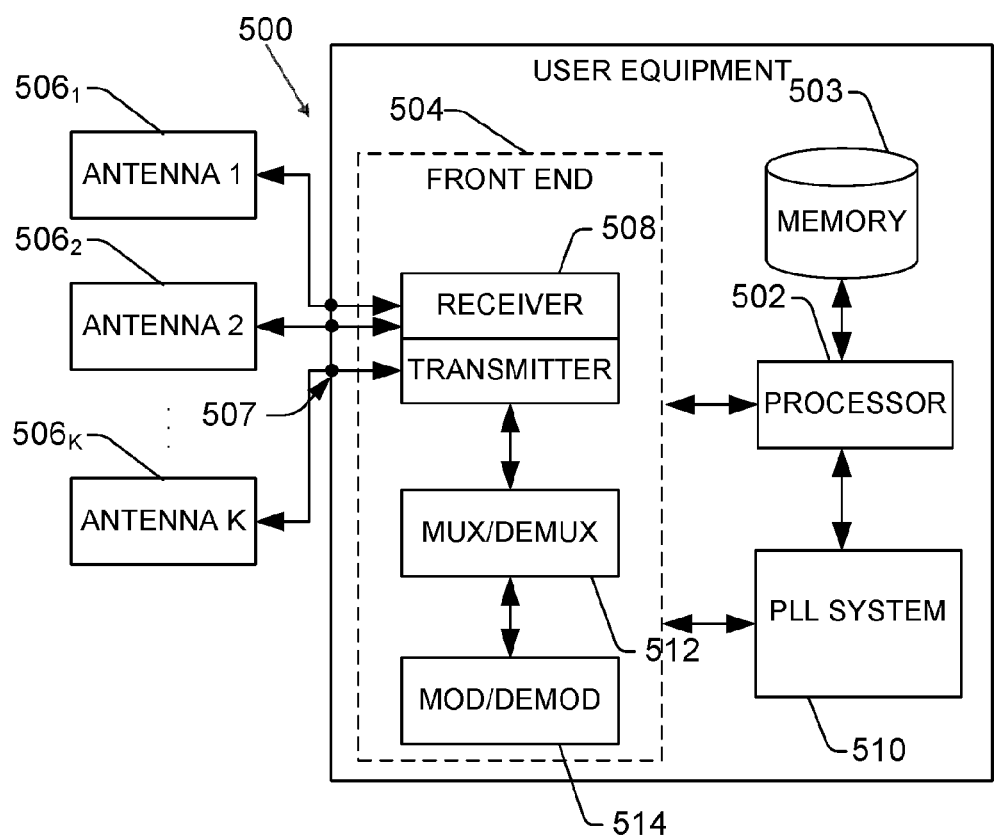
FIG. 5 illustrates an example user equipment device having a front end that includes PAPR reduction circuitry in accordance with various aspects described.

To provide further context for various aspects of the disclosed subject matter, FIG. 5 illustrates a block diagram of an embodiment of user equipment 500 (e.g., a mobile device, communication device, personal digital assistant, etc.) related to access of a network (e.g., base station, wireless access point, femtocell access point, and so forth) that can enable and/or exploit features or aspects of the disclosed aspects.

The user equipment or mobile communication device 500 can be utilized with one or more aspects of the PAPR reduction circuitry described herein according to various aspects. The user equipment device 500, for example, comprises a digital baseband processor 502 that can be coupled to a data store or memory 503, a front end 504 (e.g., an RF front end, an acoustic front end, or the other like front end) and a plurality of antenna ports 507 for connecting to a plurality of antennas $506_1$ to $506_k$ (k being a positive integer). The antennas $506_1$ to $506_k$ can receive and transmit signals to and from one or more wireless devices such as access points, access terminals, wireless ports, routers and so forth, which can operate within a radio access network or other communication network generated via a network device (not shown).

The user equipment 500 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 504 can include a communication platform, which comprises electronic components and associated circuitry that provide for processing, manipulation or shaping of the received or transmitted signals via one or more receivers or transmitters (e.g. transceivers) 508, a mux/demux component 512, and a mod/demod component 514. The front end 504 is coupled to the digital baseband processor 502 and the set of antenna ports 507, in which the set of antennas $506_1$ to $506_k$ can be part of the front end.

The processor 502 can confer functionality, at least in part, to substantially any electronic component within the mobile communication device 500, in accordance with aspects of the disclosure. As an example, the processor 502 can be configured to execute, at least in part, executable instructions that perform the method 400 of FIG. 4 and/or compute clipping error and/or adjust the I and Q signals with the clipping error. Thus the processor 500 may embody various aspects of the PAPR reduction circuitry 110, 310 of FIGS. 1 and 3. In other embodiments, the processor 502 or PAPR reduction circuitry includes custom hardware configured to compute the clipping error and/or adjust the I and Q signals with the clipping error.

The processor 502 is functionally and/or communicatively coupled (e.g., through a memory bus) to memory 503 in order to store or retrieve information necessary to operate and confer functionality, at least in part, to communication platform or front end 504, the phase locked loop system 510 and substantially any other operational aspects of the phase locked loop system 510. The phase locked loop system 510 includes at least one oscillator (e.g., a VCO, DCO or the like) that can be calibrated via core voltage, a coarse tuning value, signal, word or selection process according the various aspects described herein.

The processor 502 can operate to enable the mobile communication device 500 to process data (e.g., symbols, bits, or chips) for multiplexing/demultiplexing with the mux/demux component 512, or modulation/demodulation via the mod/demod component 514, such as implementing direct and inverse fast Fourier transforms, selection of modulation rates, selection of data packet formats, inter-packet times, etc. The processor 502 may embody the PAPR reduction circuitry (110, 310, of FIGS. 1 and 3, respectively) and perform stored instructions that calculate the clipping value. Memory 503 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation. Memory 503 may include a static random access memory (SRAM) that stores various parameters used for calculating the clipping error, such as the clipping boundary (e.g., as used by the PAPR reduction circuitry of FIGS. 1 and 3).

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a method configured to clip a signal according to a clipping boundary, wherein the signal includes an I component including a series of I values and a Q component including a series of Q values, wherein each I value and Q value pair defines Cartesian coordinates of a data point being transmitted on the real and imaginary axes of the complex plane, respectively. The method includes receiving an I value and a Q value; determining a clipping error between the I value and the Q value and the clipping boundary; combining the clipping error with the I value to generate a clipped I value; combining the clipping error with the Q value to generate a clipped Q value; and providing the clipped I value and the clipped Q value to a radio frequency digital-to-analog converter (RFDAC) in a transmit chain.

Example 2 includes the subject matter of example 1, including or omitting any optional elements, wherein determining the clipping error includes determining a vector difference between a point defined by the I value and the Q value and a nearest point on the clipping boundary.

Example 3 includes the subject matter of example 1, including or omitting any optional elements, further including filtering the clipping error to generate a filtered clipping error, and wherein the combining includes combining the filtered clipping error with the I value and combining the filtered clipping error with the Q value.

Example 4 includes the subject matter of examples 1-3, including or omitting any optional elements, wherein determining the clipping error includes determining a magnitude of the I value; determining a magnitude of the Q value; and determining the clipping error as a distance between a first point defined by the magnitude of the I value and the magnitude of the Q value and a nearest point on the clipping boundary to the first point.

Example 5 includes the subject matter of example 4, including or omitting any optional elements, wherein combining the clipping error with the I value includes applying a sign of the I value to the clipping error to generate a first signed clipping error and subtracting the first signed clipping error from the I value. Combining the clipping error with the Q value includes applying a sign of the Q value to the clipping error to generate a second signed clipping error and subtracting the second signed clipping error from the Q value.

Example 6 includes the subject matter of example 5, including or omitting any optional elements, including delaying the I value to generate a delayed I value; subtracting the first signed clipping error from the delayed I value; delaying the Q value to generate a delayed Q value; and subtracting the second signed clipping error from the delayed Q value.

Example 7 includes the subject matter of examples 1-3, including or omitting any optional elements, further including, when a clipped I value or a clipped Q value exceeds a hard clipping limit, subsequently clipping the clipped I value or the clipped Q value that exceeds the hard clipping limit.

Example 8 includes the subject matter of examples 1-3, including or omitting any optional elements, further including determining the clipping error to be zero in response to determining that a point defined by the I value and the Q value fall within the clipping boundary.

Example 9 is a peak-to-average power ratio (PAPR) reduction circuitry configured to clip a signal according to a clipping boundary, wherein the signal includes an I component including a series of I values and a Q component including a series of Q values, wherein each I value and Q value pair defines Cartesian coordinates of a data point being transmitted on the real and imaginary axes of the complex plane, respectively. The PAPR reduction circuitry includes clipping circuitry and combination circuitry. The clipping circuitry is configured to receive an I value and a Q value and determine a clipping error between the I value and the Q value and the clipping boundary. The combination circuitry is configured to combine the clipping error with the I value to generate a clipped I value; combine the clipping error with the Q value to generate a clipped Q value; and provide the clipped I value and the clipped Q value to a radio frequency digital-to-analog converter (RFDAC) in a transmit chain.

Example 10 includes the subject matter of example 9, including or omitting any optional elements, wherein the clipping circuitry is configured to determine the clipping error by determining a vector difference between a point defined by the I value and the Q value and a nearest point on the clipping boundary.

Example 11 includes the subject matter of example 9, including or omitting any optional elements, further including filter circuitry configured to filter the clipping error to generate a filtered clipping error, and wherein the combination circuitry is configured to combine the filtered clipping error with the I value and combine the filtered clipping error with the Q value.

Example 12 includes the subject matter of examples 9-11, including or omitting any optional elements, wherein the clipping circuitry is configured to determine the clipping error by determining a magnitude of the I value; determining a magnitude of the Q value; and determining the clipping error as a distance between a first point defined by the magnitude of the I value and the magnitude of the Q value and a nearest point on the clipping boundary to the first point.

Example 13 includes the subject matter of example 12, including or omitting any optional elements, wherein the combination circuitry is configured to apply a sign of the I value to the clipping error to generate a first signed clipping error; subtract the first signed clipping error from the I value; apply a sign of the Q value to the clipping error to generate a second signed clipping error; and subtract the second signed clipping error from the Q value.

Example 14 includes the subject matter of example 13, including or omitting any optional elements, wherein the combination circuitry is configured to delay the I value to generate a delayed I value; subtract the first signed clipping error from the delayed I value; delay the Q value to generate a delayed Q value; and subtract the second signed clipping error from the delayed Q value.

Example 15 includes the subject matter of examples 9-11, including or omitting any optional elements, further including the RFDAC, and wherein the RFDAC is configured to subsequently clip a clipped I value or a clipped Q value that exceeds the hard clipping limit.

Example 16 includes the subject matter of examples 9-11, including or omitting any optional elements, wherein the clipping circuitry is configured to determine the clipping error as zero in response to determining that a point defined by the I value and the Q value fall within the clipping boundary.

Example 17 is a transmitter, including a peak-to-average power ratio (PAPR) reduction circuitry and a radio frequency digital-to-analog converter (RFDAC). The PAPR reduction circuitry is configured to receive an I value and a Q value, wherein the I value and Q value define Cartesian coordinates of a data point being transmitted on the real and imaginary axes of the complex plane, respectively; determine a clipping error between the I value and the Q value and a clipping boundary; combine the clipping error with the I value to generate a clipped I value; and combine the clipping error with the Q value to generate a clipped Q value. The RFDAC is configured to receive the clipped I value and the clipped Q value and generate an analog transmit signal based on the clipped I value and the clipped Q value.

Example 18 includes the subject matter of example 17, including or omitting any optional elements, wherein the PAPR reduction circuitry is further configured to filter the clipping error to generate a filtered clipping error; combine the filtered clipping error with the I value; and combine the filtered clipping error with the Q value.

Example 19 includes the subject matter of examples 17-18, including or omitting any optional elements, wherein the PAPR reduction circuitry is further configured to determine a magnitude of the I value; determine a magnitude of the Q value; and determine the clipping error as a distance between a first point defined by the magnitude of the I value and the magnitude of the Q value and a nearest point on the clipping boundary to the first point.

Example 20 includes the subject matter of examples 17-18, including or omitting any optional elements, wherein the PAPR reduction circuitry is further configured to determine the clipping error as zero in response to determining that a point defined by the I value and the Q value fall within the clipping boundary; apply a sign of the I value to the clipping error to generate a first signed clipping error; delay the I value to generate a delayed I value; subtract the first signed clipping error from the delayed I value; apply a sign of the Q value to the clipping error to generate a second signed clipping error; delay the Q value to generate a delayed Q value; and subtract the second signed clipping error from the Q value.

Example 21 includes the subject matter of examples 17-18, including or omitting any optional elements, wherein the RFDAC is configured to subsequently clip the clipped I value or the clipped Q value if the clipped I value or the clipped Q value exceeds a hard clipping limit.

Example 22 is an apparatus configured to clip an I signal and a Q signal according to a clipping boundary, including means for receiving an I value and a Q value, wherein the I value and Q value define Cartesian coordinates of a data point being transmitted on the real and imaginary axes of the complex plane, respectively; means for determining a clipping error between the I value and the Q value and the clipping boundary; means for combining the clipping error with the I value to generate a clipped I value; means for combining the clipping error with the Q value to generate a clipped Q value; and means for providing the clipped I value and the clipped Q value to a radio frequency digital-to-analog converter (RFDAC) in a transmit chain.

Example 23 includes the subject matter of example 22, including or omitting any optional elements, wherein the means for determining the clipping error is configured to determine a vector difference between a point defined by the I value and the Q value and a nearest point on the clipping boundary.

Example 24 includes the subject matter of examples 22-23, including or omitting any optional elements, further including means for filtering the clipping error to generate a filtered clipping error, and wherein the means for combining is configured to combine the filtered clipping error with the I value and combine the filtered clipping error with the Q value.

Example 25 includes the subject matter of examples 22-23, including or omitting any optional elements, further including: means for determining the clipping error as zero in response to determining that a point defined by the I value and the Q value fall within the clipping boundary; means for applying a sign of the I value to the clipping error to generate a first signed clipping error; means for delaying the I value to generate a delayed I value; means for subtracting the first signed clipping error from the delayed I value; means for applying a sign of the Q value to the clipping error to generate a second signed clipping error; means for delaying the Q value to generate a delayed Q value; and means for subtracting the second signed clipping error from the Q value.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method configured to clip a signal according to a clipping boundary, wherein the signal comprises an I component comprising a series of I values and a Q component comprising a series of Q values, wherein each I value and Q value pair defines Cartesian coordinates of a data point being transmitted on the real and imaginary axes of the complex plane, respectively, the method comprising:
   receiving an I value and a Q value;
   determining a magnitude of the I value;
   determining a magnitude of the Q value; and
   determining a clipping error as a distance between a first point defined by the magnitude of the I value and the magnitude of the Q value and a nearest point on the clipping boundary to the first point;
   combining the clipping error with the I value to generate a clipped I value;
   combining the clipping error with the Q value to generate a clipped Q value; and
   providing the clipped I value and the clipped Q value to a radio frequency digital-to-analog converter (RFDAC) in a transmit chain.

2. The method of claim 1, wherein determining the clipping error comprises determining a vector difference between a point defined by the I value and the Q value and a nearest point on the clipping boundary.

3. The method of claim 1, further comprising:
   filtering the clipping error to generate a filtered clipping error, and wherein the combining comprises:
      combining the filtered clipping error with the I value; and
      combining the filtered clipping error with the Q value.

4. The method of claim 1, wherein:
   combining the clipping error with the I value comprises:
      applying a sign of the I value to the clipping error to generate a first signed clipping error; and
      subtracting the first signed clipping error from the I value; and combining the clipping error with the Q value comprises:
   applying a sign of the Q value to the clipping error to generate a second signed clipping error; and
   subtracting the second signed clipping error from the Q value.

5. The method of claim 4, comprising:
delaying the I value to generate a delayed I value;
subtracting the first signed clipping error from the delayed I value;
delaying the Q value to generate a delayed Q value; and
subtracting the second signed clipping error from the delayed Q value.

6. The method of claim 1, further comprising, if a clipped I value or a clipped Q value exceeds a hard clipping limit, subsequently clipping the clipped I value or the clipped Q value that exceeds the hard clipping limit.

7. The method of claim 1, further comprising determining the clipping error to be zero in response to determining that a point defined by the I value and the Q value falls within the clipping boundary.

8. A peak-to-average power ratio (PAPR) reduction circuitry configured to clip a signal according to a clipping boundary, wherein the signal comprises an I component comprising a series of I values and a Q component comprising a series of Q values, wherein each I value and Q value pair defines Cartesian coordinates of a data point being transmitted on the real and imaginary axes of the complex plane, respectively, the PAPR reduction circuitry comprising:
   clipping circuitry configured to:
      receive an I value and a Q value;
      determine a magnitude of the I value;
      determine a magnitude of the Q value; and
      determine a clipping error as a distance between a first point defined by the magnitude of the I value and the magnitude of the Q value and a nearest point on the clipping boundary to the first point; and
   combination circuitry configured to:
      combine the clipping error with the I value to generate a clipped I value;
      combine the clipping error with the Q value to generate a clipped Q value; and
      provide the clipped I value and the clipped Q value to a radio frequency digital-to-analog converter (RFDAC) in a transmit chain.

9. The PAPR reduction circuitry of claim 8, wherein the clipping circuitry is configured to determine the clipping error by determining a vector difference between a point defined by the I value and the Q value and a nearest point on the clipping boundary.

10. The PAPR reduction circuitry of claim 8, further comprising filter circuitry configured to filter the clipping error to generate a filtered clipping error, and wherein the combination circuitry is configured to combine the filtered clipping error with the I value and combine the filtered clipping error with the Q value.

11. The PAPR reduction circuitry of claim 8, wherein:
   the combination circuitry is configured to:
      apply a sign of the I value to the clipping error to generate a first signed clipping error; and
      subtract the first signed clipping error from the I value; and
      apply a sign of the Q value to the clipping error to generate a second signed clipping error; and
      subtract the second signed clipping error from the Q value.

12. The PAPR reduction circuitry of claim 11, wherein the combination circuitry is configured to:
   delay the I value to generate a delayed I value;
   subtract the first signed clipping error from the delayed I value;
   delay the Q value to generate a delayed Q value; and
   subtract the second signed clipping error from the delayed Q value.

13. The PAPR reduction circuitry of claim 8, further comprising the RFDAC, and wherein the RFDAC is configured to subsequently clip a clipped I value or a clipped Q value that exceeds a hard clipping limit.

14. The PAPR reduction circuitry of claim 8, wherein the clipping circuitry is configured to determine the clipping error as zero in response to determining that a point defined by the I value and the Q value falls within the clipping boundary.

15. A transmitter, comprising:
   a peak-to-average power ratio (PAPR) reduction circuitry configured to:
      receive an I value and a Q value, wherein the I value and Q value define Cartesian coordinates of a data point being transmitted on the real and imaginary axes of the complex plane, respectively;
      determine a magnitude of the I value;
      determine a magnitude of the Q value;
      determine a clipping error as a distance between a first point defined by the magnitude of the I value and the magnitude of the Q value and a nearest point on a clipping boundary to the first point;
      combine the clipping error with the I value to generate a clipped I value; and
      combine the clipping error with the Q value to generate a clipped Q value; and
   a radio frequency digital-to-analog converter (RFDAC) configured to:
      receive the clipped I value and the clipped Q value; and
      generate an analog transmit signal based on the clipped I value and the clipped Q value.

16. The transmitter of claim 15, wherein the PAPR reduction circuitry is further configured to:
   filter the clipping error to generate a filtered clipping error;
   combine the filtered clipping error with the I value; and
   combine the filtered clipping error with the Q value.

17. The transmitter of claim 15, wherein the PAPR reduction circuitry is further configured to:
   determine the clipping error as zero in response to determining that a point defined by the I value and the Q value falls within the clipping boundary;
   apply a sign of the I value to the clipping error to generate a first signed clipping error;
   delay the I value to generate a delayed I value;
   subtract the first signed clipping error from the delayed I value;
   apply a sign of the Q value to the clipping error to generate a second signed clipping error;
   delay the Q value to generate a delayed Q value; and
   subtract the second signed clipping error from the Q value.

18. The transmitter of claim 15, wherein the RFDAC is configured to subsequently clip the clipped I value or the clipped Q value if the clipped I value or the clipped Q value exceeds a hard clipping limit.

* * * * *